US010760942B1

(12) United States Patent
Nobles

(10) Patent No.: US 10,760,942 B1
(45) Date of Patent: Sep. 1, 2020

(54) CALIBRATING MEASURED FILL-LEVEL OF A CONTAINER BASED ON MEASUREMENT DISRUPTION EVENT DETECTION

(71) Applicant: Chevron U.S.A. Inc., San Ramon, CA (US)

(72) Inventor: Jerry Kieth Nobles, Moss Point, MS (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 16/293,963

(22) Filed: Mar. 6, 2019

(51) Int. Cl.
*G01F 25/00* (2006.01)
*G01F 23/288* (2006.01)
*G01N 21/47* (2006.01)
*G01N 21/51* (2006.01)

(52) U.S. Cl.
CPC .......... *G01F 23/288* (2013.01); *G01F 25/00* (2013.01); *G01N 21/4785* (2013.01); *G01N 21/51* (2013.01); *G01N 2021/4711* (2013.01)

(58) Field of Classification Search
CPC ... G01F 23/288; G01F 25/00; G01N 21/4785; G01N 21/51; G01N 2021/4711
See application file for complete search history.

(56) References Cited

U.S. PATENT DOCUMENTS

| 5,485,740 | A | * | 1/1996 | Lippmann | G01F 23/36 |
| | | | | | 73/1.73 |
| 8,560,268 | B2 | * | 10/2013 | Smithson | E21B 47/042 |
| | | | | | 702/166 |
| 9,513,155 | B2 | * | 12/2016 | Harper | G01F 23/30 |
| 2005/0044952 | A1 | * | 3/2005 | Schroth | G01F 1/007 |
| | | | | | 73/290 V |
| 2006/0138330 | A1 | * | 6/2006 | Baldwin | G01T 1/167 |
| | | | | | 250/357.1 |
| 2006/0277992 | A1 | * | 12/2006 | Calabrese | G01F 23/266 |
| | | | | | 73/304 R |
| 2007/0214880 | A1 | * | 9/2007 | Spanke | G01F 23/284 |
| | | | | | 73/290 V |
| 2016/0290851 | A1 | * | 10/2016 | Tsuruta | G01F 25/0076 |
| 2019/0041074 | A1 | * | 2/2019 | Minakian | F24F 11/30 |

* cited by examiner

*Primary Examiner* — Marcus H Taningco
(74) *Attorney, Agent, or Firm* — Esplin & Associates, PC

(57) ABSTRACT

Substance level of a container at a moment may be measured. Filtered substance level for the moment may be determined based on multiple substance levels of the container at multiple moments preceding the moment. An occurrence of a measurement disruption event at the moment may be detected based on the substance level being smaller than the filtered substance level and the difference between the substance level and the filtered substance level exceeding a difference threshold. Responsive to detection of the occurrence of the measurement disruption event, the substance level may be calibrated.

20 Claims, 6 Drawing Sheets

CALIBRATING MEASURED FILL-LEVEL OF A CONTAINER BASED ON MEASUREMENT DISRUPTION EVENT DETECTION

FIELD

The present disclosure relates generally to the field of calibrating measured fill-level of a container.

BACKGROUND

The level of substance (e.g., product, catalyst, dry objects, liquid) in a container, may be determined by using a sensor, such as a nuclear source and a nuclear level detector. The container may be positioned between the nuclear source and the nuclear level detector. The nuclear level detector may count the number of gamma rays received from the nuclear source, and the counts-per-second may be converted into a fill-level (e.g., a percentage value) of substance within the container. However, readings of the nuclear level detector may be impacted by a measurement disruption event, such as a radiation event. For example, an X-ray emitted by other nuclear source(s) (e.g., for radiographic photography) may hit the nuclear level detector and cause the nuclear level detector to report a fill-level lower than the actual fill-level of the substance within the container.

SUMMARY

This disclosure relates to calibrating measured fill-level of a container. Fill-level information for the container may be obtained. The fill-level information may characterize a substance level of one or more substances within the container at different moments. A first substance level at a first moment may be determined based on the fill-level information and/or other information. A first corresponding filtered substance level for the first moment may be determined based on multiple substance levels at multiple moments preceding the first moment and/or other information. A measurement disruption event criterion for detecting a measurement disruption event for the container may be obtained. The measurement disruption event criterion may be satisfied based on a substance level at a moment being smaller than a corresponding filtered substance level and a difference between the substance level at the moment and the corresponding filtered substance level exceeding a difference threshold. An occurrence of the measurement disruption event at the first moment may be detected based on the measurement disruption event criterion and a comparison of the first substance level with the first corresponding filtered substance level. The first substance level may be smaller than the first corresponding filtered substance level and the difference between the first substance level and the first corresponding filtered substance level may exceed the difference threshold. Responsive to detection of the occurrence of the measurement disruption event at the first moment, the substance level characterized by the fill-level information may be calibrated.

A system that calibrates measured fill-level of a container may include one or more electronic storage, one or more processors and/or other components. In some implementations, the system may include one or more fill-level sensors. The electronic storage may store fill-level information, information relating to a container, information relating to substance level of one or more substances within a container, information relating to corresponding filtered substance level, information relating to measurement disruption event, information relating to measurement disruption event criterion, information relating to comparison of the substance level with the corresponding filtered substance level, information relating to occurrence of measurement disruption event, information relating to detection of occurrence of measurement disruption event, and/or other information.

The fill-level sensor(s) may be configured to generate an output signal conveying fill-level information for a container. The fill-level information may characterize a substance level of one or more substances within the container at different moments.

In some implementations, the fill-level sensor may include one or more nuclear sources, one or more nuclear level detectors, and/or other components. A measurement disruption event for the fill-level sensor may include a radiation event and/or other events. The radiation event may include a nuclear level detector receiving an X-ray from one or more other nuclear sources. The X-ray may be emitted by the other nuclear source(s) for radiographic photography. The X-ray may impact accuracy of the nuclear level detector.

The processor(s) may be configured by machine-readable instructions. Executing the machine-readable instructions may cause the processor(s) to facilitate calibrating measured fill-level of a container. The machine-readable instructions may include one or more computer program components. The computer program components may include one or more of a fill-level information component, a substance level component, a filtered substance level component, an event criterion component, an event detection component, a calibration component, and/or other computer program components.

The fill-level information component may be configured to obtain fill-level information for a container and/or other information. Fill-level information for a container may characterize a substance level of one or more substances within a container at different moments. The fill-level information component may obtain fill-level information directly and/or indirectly from one or more fill-level sensors.

The substance level component may be configured to determine one or more substance levels at one or more moments based on the fill-level information and/or other information. A moment may include one or more points in time and/or one or more durations of time. For example, the substance level component may determine a first substance level of substance(s) within the container at a first moment. The substance level component may determine substance level(s) of substance(s) within the container at other moment(s).

The filtered substance level component may be configured to determine one or more corresponding filtered substance levels for one or more moments based on multiple substance levels at multiple moments preceding the individual moments and/or other information. For example, the filtered substance level component may determine a first corresponding filtered substance level for the first moment based on multiple substance levels at multiple moments preceding the first moment and/or other information. The filtered substance level component may determine corresponding filtered substance level(s) for other moment(s).

In some implementations, a corresponding filtered substance level for a moment may be determined based on averaging of multiple substance levels at multiple moments preceding the moment, and/or other information. In some implementations, a corresponding filtered substance level for a moment may be determined based on filtering of multiple substance levels at multiple moments preceding the moment based on a time constant, and/or other information.

The event criterion component may be configured to obtain one or more measurement disruption event criteria for detecting one or more measurement disruption events for the container. A measurement disruption event criterion may be satisfied based on (1) a substance level of the container at a moment being smaller than a corresponding filtered substance level, (2) a difference between the substance level at the moment and the corresponding filtered substance level exceeding a difference threshold, and/or other information. In some implementations, the difference threshold may include a percentage difference between the substance level and the corresponding filtered substance level.

The event detection component may be configured to detect an occurrence of a measurement disruption event at one or more moments based on one or more measurement disruption event criteria, one or more comparisons of the substance level with the corresponding filtered substance level, and/or other information. For example, event detection component may detect an occurrence of a measurement disruption event at the first moment based on a measurement disruption event criterion, a comparison of the first substance level with the first corresponding filtered substance level, and/or other information. The comparison may indicate that the first substance level is smaller than the first corresponding filtered substance level and that the difference between the first substance level and the first corresponding filtered substance level exceeds the difference threshold.

The calibration component may be configured to, responsive to detection of the occurrence of the measurement disruption event at one or more moments, calibrate the substance level characterized by the fill-level information. Calibration of the substance level may include replacement of one or more substance level at one or more moments with a prior substance level. For example, responsive to detection of the occurrence of the measurement disruption event at the first moment, the calibration component may replace the first substance level at the first moment with a prior substance level at a prior moment preceding the first moment.

In some implementations, the prior substance level may be held for a duration following the corresponding moment (e.g., the first moment). The duration for which the prior substance level is held may be determined based on the prior substance level, a minimum substance level for the container, a substance level change rate for the container, and/or other information. The duration for which the prior substance level is held may be determined based on a comparison of a current substance level with the prior substance level, and/or other information. The duration may terminate based on the current substance level being within a threshold percentage of the prior substance level.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to calibrating measured fill-level of a container. The methods and systems of the present disclosure take advantage of measurement disruption events causing rapid changes in level measurements. To detect a measurement disruption event, a level measurement (e.g., most current measurement, last measurement) may be compared with prior level measurements (e.g., average or filtered value of last 8 seconds of level measurements). A measurement disruption event may be determined to have occurred if the percentage difference between the level measurement and the prior level measurements is (1) negative and (2) exceeds a set threshold.

When a measurement disruption event is detected, the level measurement from the detector (which may be lower than the actual level because of the measurement disruption event) may be replaced with a prior level measurement (e.g., measurement from 2 seconds before, last known good value) and held for a duration of time. The duration of time for which the prior level measurement is held may depend on (1) a hold time calculated based on the prior level measurement, and/or (2) the level measurement from the detector rebounding within a certain percentage of the prior level measurement.

Figure 1:
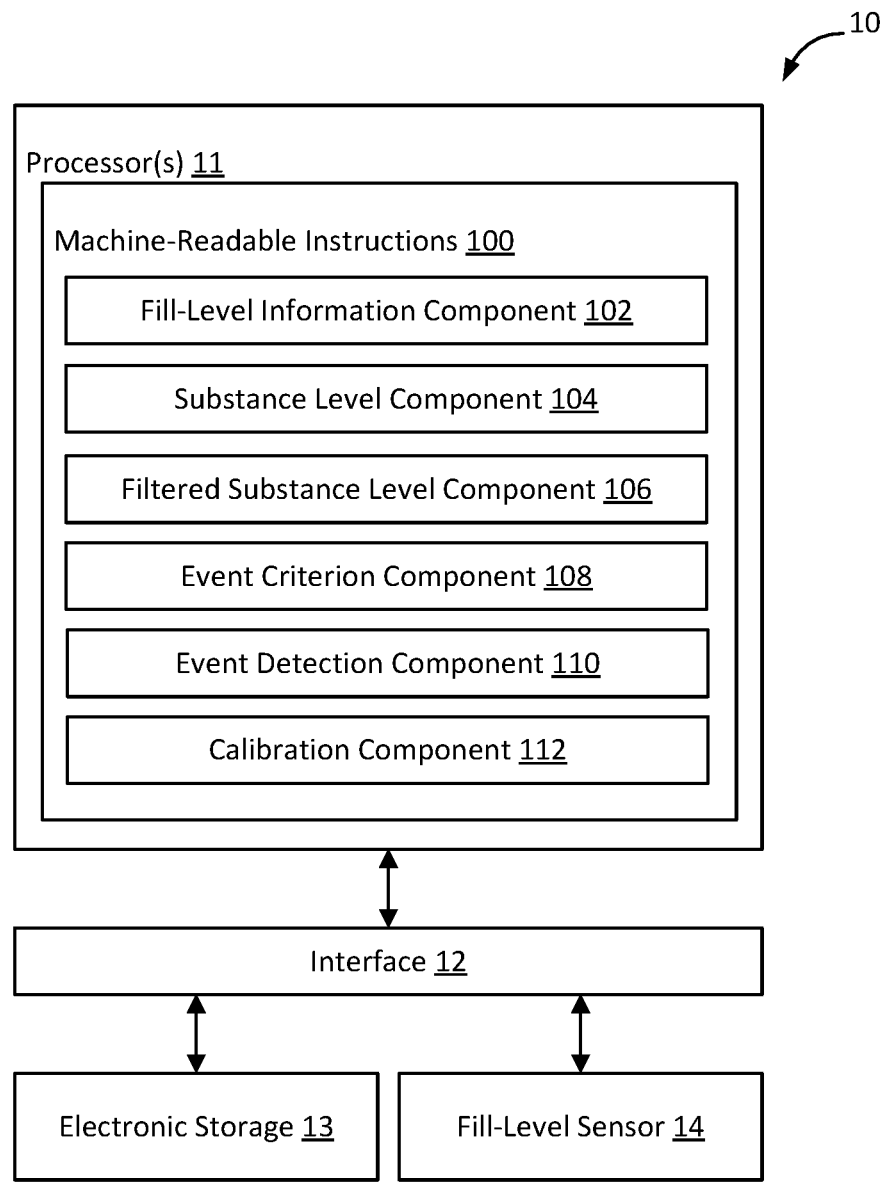
FIG. 1 illustrates an example system that calibrates measured fill-level of a container.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. In some implementations, the system 10 may include a fill-level sensor 14 and/or other sensors.

Fill-level information for the container and/or other information may be obtained by the processor 11. The fill-level information may characterize a substance level of one or more substances within the container at different moments. A first substance level at a first moment may be determined by the processor 11 based on the fill-level information and/or other information. A first corresponding filtered substance level for the first moment may be determined by the processor 11 based on multiple substance levels at multiple moments preceding the first moment and/or other information. A measurement disruption event criterion for detecting a measurement disruption event for the container may be obtained by the processor 11. The measurement disruption event criterion may be satisfied based on a substance level at a moment being smaller than a corresponding filtered substance level and a difference between the substance level at the moment and the corresponding filtered substance level exceeding a difference threshold.

An occurrence of the measurement disruption event at the first moment may be detected by the processor 11 based on the measurement disruption event criterion, a comparison of the first substance level with the first corresponding filtered substance level, and/or other information. The first substance level may be smaller than the first corresponding filtered substance level and the difference between the first substance level and the first corresponding filtered substance level may exceed the difference threshold. Responsive to detection of the occurrence of the measurement disruption event at the first moment, the substance level characterized by the fill-level information may be calibrated by the processor 11.

The fill-level sensor 14 may refer to a device that monitors (e.g., measures, ascertains, detects, estimates) one or more physical properties to determine a fill-level of a container. A container may refer to one or more objects that may be used to hold one or more substances. A container may have a symmetrical shape or a non-symmetrical shape. A substance may refer to a particular kind of matter. A substance may include a product, a catalyst, a dry object, liquid, and/or other types of matter. A fill-level of a container may refer to a level in the container to which substance(s) are filled. A fill-level of a container may be expressed in terms of numbers (e.g., percentage, amount value) and/or categories (e.g., empty, quarter-full, half-full, full).

The fill-level sensor 14 may include one or more sensors that converts monitored physical propert(ies) into output (electrical signals). The fill-level sensor 14 may generate one or more output signals that convey fill-level information for a container. The fill-level information may characterize a substance level of one or more substances within the container at different moments in time. A substance level of substance(s) may refer to fill-level of the substance(s). The substance level of a substance within a container may be expected to remain the same or change over time. For example, a container may be used to hold a substance for a duration of time, with no expected change in the amount of substance in the container. A container may be used to gather and provide substance. For instance, a container may include an opening (entry opening) through which a substance enters the container and an opening (exit opening) though which the substance exits the container. The fill-level information characterizing the substance levels of the substances at different times may be used to monitor the level/amount of substance in the container to ensure that sufficient level/amount of substance is present within the container and/or that the substance is entering/exiting the container at the expected or desired rate.

The fill-level sensor 14 may monitor different types of physical properties to generate output signals conveying fill-level information. For example, the fill-level sensor 14 may include one or more radiation sources, one or more detectors, and/or other components. A radiation source may emit one or more forms of energy and a detector may detect the form(s) of energy emitted by the radiation source. The amount of emitted energy detected by the detector may be used to determine the substance level of substance(s) in a container. The amount of emitted energy detected by the detector may be used to generate output signals conveying fill-level information.

For example, the fill-level sensor 14 may include one or more nuclear sources, one or more nuclear level detectors, and/or other components. A nuclear source may emit gamma rays and/or other rays. The nuclear level detector may include one or more atoms that may be excited by the emitted rays and from which a substance level of a container may be determined. For instance, when an atom of the nuclear level detector is excited by a gamma ray, the atom may create a flash. The flash may be detected and counted by the nuclear level detector. The substance in the container may block the gamma ray from the nuclear source, and the number of counts of flash per a duration of time (e.g., counts-per-second) may be interpreted as the substance level (e.g., percent level) of the substance in the container. For instance, a nuclear level detector may record a high count-per-second when a container is empty and may record a low count-per-second when the container is full. Other forms of energy and other types of fill-level sensors, such as a guided wave radar sensor, are contemplated.

The operation of the fill-level sensor 14 may be impacted by a measurement disruption event. A measurement disruption event may refer to an event that affects the accuracy of the substance level determined by the fill-level sensor 14. That is, a measurement disruption event may impact the accuracy of the outputs of the fill-level sensor 14. For example, a measurement disruption event may cause the fill-level sensor 14 to determine (measure) a substance level that is lower than or higher than the actual substance level of substance(s) within the container. A measurement disruption event may impact the operation of the fill-level sensor 14 at one or more moments during the operation of the fill-level sensor. A moment may include one or more points in time and/or one or more durations of time.

Figure 3:
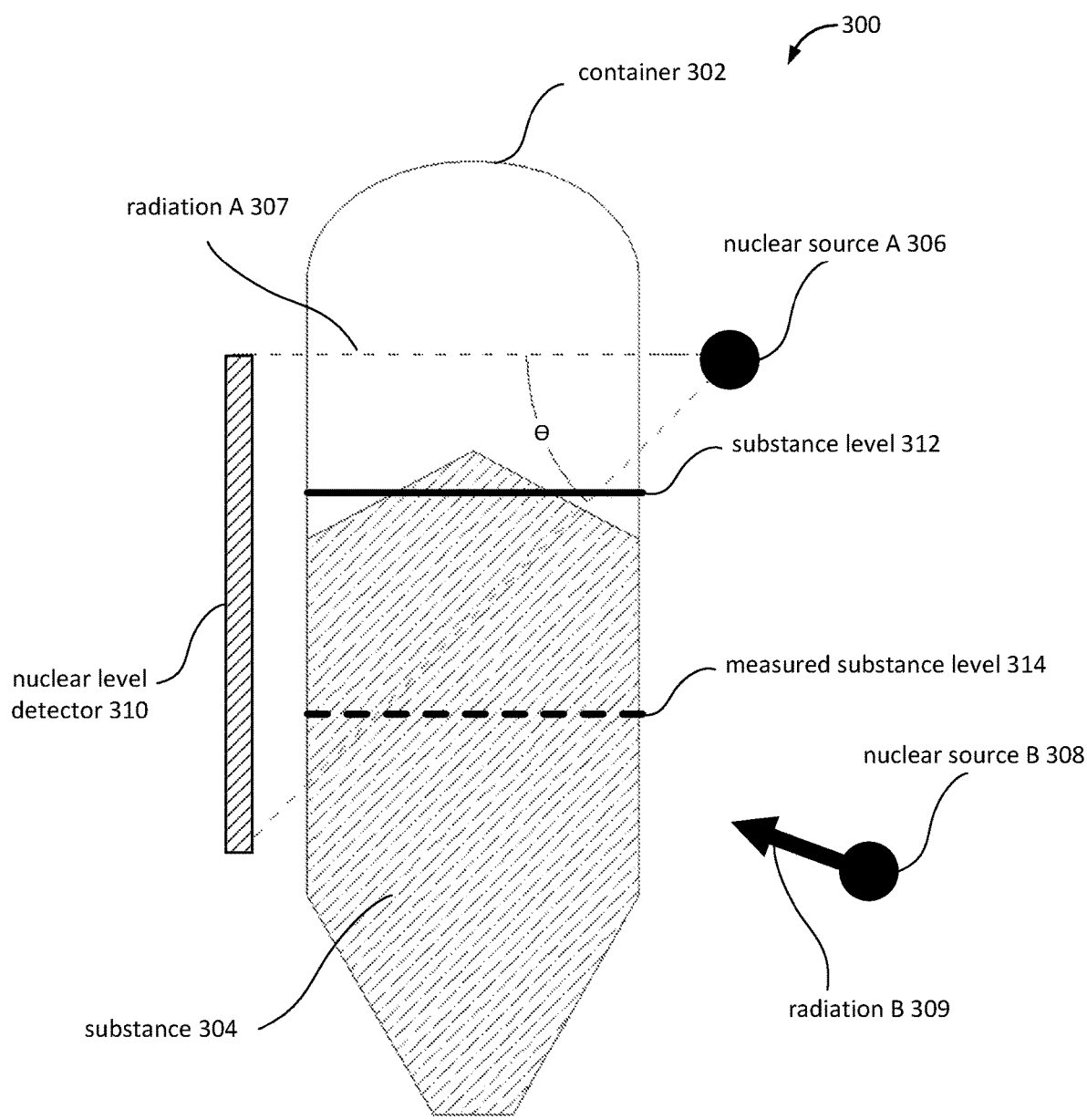
FIG. 3 illustrates an example environment for measuring substance level within a container.

FIG. 3 illustrates an example environment 300 for measuring substance level within a container. The environment 300 may include a container 302, a nuclear source A 306, a nuclear source B 308, and a nuclear level detector 310. The container 302 may include a substance 304. The nuclear source A 306 may emit radiation A 307 within an angle θ, which may be detected by the nuclear level detector 310. The nuclear level detector 310 may interpret the amount of radiation A 307 received by the nuclear level detector 310 as the level of substance 304 in the container 302. For example, based on the amount of substance 304 shown in FIG. 3, the nuclear level detector 310 may receive a certain portion of the radiation A 307 and may interpret the received radiation A 307 as a substance level 312.

A measurement disruption event for the nuclear level detector 310 may include one or more radiation events and/or other events. A radiation event for the nuclear level detector 310 may refer to an event in which the nuclear level detector 310 receives radiation from source(s) other than the nuclear source A 306. Radiation from other source(s) may cause the count of the flash detected and counted by the nuclear level detector 310 to be higher than if the nuclear level detector 310 received only the radiation A 307 from the nuclear source A 306. The higher counts may cause the nuclear level detector 310 to report the substance level of substance 304 in the container 302 to be lower than the substance level 312. Other types of measurement disruption events are contemplated.

For example, a radiation event may include the nuclear level detector 310 receiving radiation B 309 from the nuclear source B 308. The nuclear source B 308 may include one or more unknown nuclear sources and/or one or more nuclear sources used for purposes other than measuring the fill-level of a container. For instance, the nuclear source B 308 may include one or more nuclear sources used for radiographic photography (e.g., used for periodic X-ray imaging to examine piping and container wall thickness, to detect corrosion and/or erosion rates), and the radiation B 309 may include one or more X-rays emitted by the nuclear source B 308. The nuclear source B 308 may be stronger than the nuclear source A 306. For instance, the radiation B 309 emitted by the nuclear source B 308 may be thousands of times more intense than the radiation A 307 emitted by the nuclear source 306. The X-ray(s) emitted by the nuclear source B 308 may impact the accuracy of the nuclear level detector 310. For instance, based on reception of the radiation B 309 from the nuclear source B 308 and the corresponding higher counts of flash, the nuclear level detector 310 may report the substance level of substance 304 in the container 302 to be at a measured substance level 314.

Inaccurate measurement of substance level within a container may lead to problems in usage of the container. For example, a control system may control the flow-in rate and/or flow-out rate of substance in the container to maintain the substance level within a range of acceptable substance levels. The control system may control the flow-in rate and/or flow-out rate of substance in the container to maintain a desired flow rate of the substance. A measurement disruption event that causes the fill-level sensor 14 to report an inaccurate substance level may lead the control system to erroneously change the fill level, the flow-in rate, and/or flow-out rate of substance in the container. For example, based on the measurement disruption event causing the fill-level sensor 14 to report a substance level that is lower than the actual substance level, the control system may attempt to fill the container when the container does not need to be filled and/or to fill up the container at a faster rate than is needed. Such filling of the container may result in the substance level rising above the range of acceptable substance levels. That is, the container may be overfilled.

As another example, based on the measurement disruption event causing the fill-level sensor 14 to report a substance level that is higher than the actual substance level, the control system may attempt to decrease the amount of substance in the container when the amount of substance does not need to be decreased and/or to decrease the amount of substance in the container at a faster rate than is needed. Such emptying of the container may result in the substance level falling below the range of acceptable substance levels. That is, the container may be underfilled. Thus, a measurement disruption event may cause undesirable fluctuations in the substance level of substance(s) in a container, and manual correction of the substance level in the container may be required.

A measurement disruption event may cause rapid changes in the substance level measured by the fill-level sensor 14. The rate at which the values of the measured substance level changes due to a measurement disruption event may be higher than changes of the substance level expected from normal usage/operation of the container. For instance, referring to FIG. 3, the container 302 may have an inside diameter of 8 feet and a height of 12 feet. The addition and removal rate of the substance 304 for the container 302 may be 75 pounds/minute, with the substance 304 having a weight of 35 pounds/ft$^3$. The volume of the container 302 may be calculated as 603 ft$^3$ (height×$\pi r^2$), and the total weight of the substance 304 may be calculated as 21,112 pounds (substance weight/volume×container volume). The time to go from 100% substance level to 0% substance level may be calculated as 281 minutes (total weight of the substance/removal-rate). The rate of substance level change in the container 302 may be calculated as 0.36% per minute (100%/time to go from 100% to 0%).

A measurement disruption event for the container 302 may change the measured substance level at a much higher rate. For example, a radiation event for the container 302 may change the substance level by about or more than 38% per minute, which is a factor of 100 in rate of change compared with the expected rate of substance level change in the container 302. Other changes in substance level are contemplated.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store fill-level information, information relating to a container, information relating to substance level of one or more substances within a container, information relating to corresponding filtered substance level, information relating to measurement disruption event, information relating to measurement disruption event criterion, information relating to comparison of the substance level with the corresponding filtered substance level, information relating to occurrence of measurement disruption event, information relating to detection of occurrence of measurement disruption event, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate calibrating measured fill-level of a container. The machine-readable instructions 100 may include one or more computer program components. The machine-readable instructions 100 may include one or more of a fill-level information component 102, a substance level component 104, a filtered substance level component 106, an event criterion component 108, an event detection component 110, a calibration component 112, and/or other computer program components.

The fill-level information component 102 may be configured to obtain fill-level information for a container and/or other information. Fill-level information for a container may characterize a substance level of one or more substances within a container at different moments. Obtaining fill-level information may include one or more of accessing, acquiring, analyzing, determining, examining, identifying, loading, locating, opening, receiving, retrieving, reviewing, storing, utilizing, and/or otherwise obtaining the fill-level information. The fill-level information component 102 may obtain fill-level information from one or more locations. For example, the fill-level information component 102 may obtain fill-level information from a storage location, such as the electronic storage 13, electronic storage of information and/or signals generated by one or more fill-level sensors (e.g., the fill-level sensor 14) and/or one or more components of fill-level sensor(s), electronic storage of a device accessible via a network, and/or other locations. The fill-level information component 102 may obtain fill-level information from one or more hardware components (e.g., the fill-level sensor 14) and/or one or more software components (e.g., software running on a computing device).

The fill-level information component 102 may obtain fill-level information directly and/or indirectly from one or more fill-level sensors (e.g., the fill-level sensor 14). For example, the fill-level information component 102 may obtain fill-level information from the nuclear level detector 310 (shown in FIG. 3) and/or may obtain the fill-level information from one or more devices communicatively coupled to the nuclear level detector 310. For instance, the fill-level information component 102 may obtain the output of the nuclear level detector 310 directly or indirectly from the nuclear level detector 310. The output may include and/or be the fill-level information. The output may include and/or be the output signal generated by the nuclear level detector 310, with the output signal conveying the fill-level information.

The substance level component 104 may be configured to determine one or more substance levels at one or more moments based on the fill-level information and/or other information. A moment may include one or more points in time and/or one or more durations of time. For example, the substance level component 104 may determine a substance level of substance(s) within the container at a particular moment. The substance level component 104 may determine substance level(s) of substance(s) within the container at other moment(s), such as moment(s) preceding and/or following the particular moment. In some implementations, the substance level of substance(s) within the container at the particular moment may correspond to the most current and/or the last value of the substance level measured by the fill-level sensor 14 (e.g., latest measurement of the substance level reported by the nuclear level detector 310).

Figure 4:
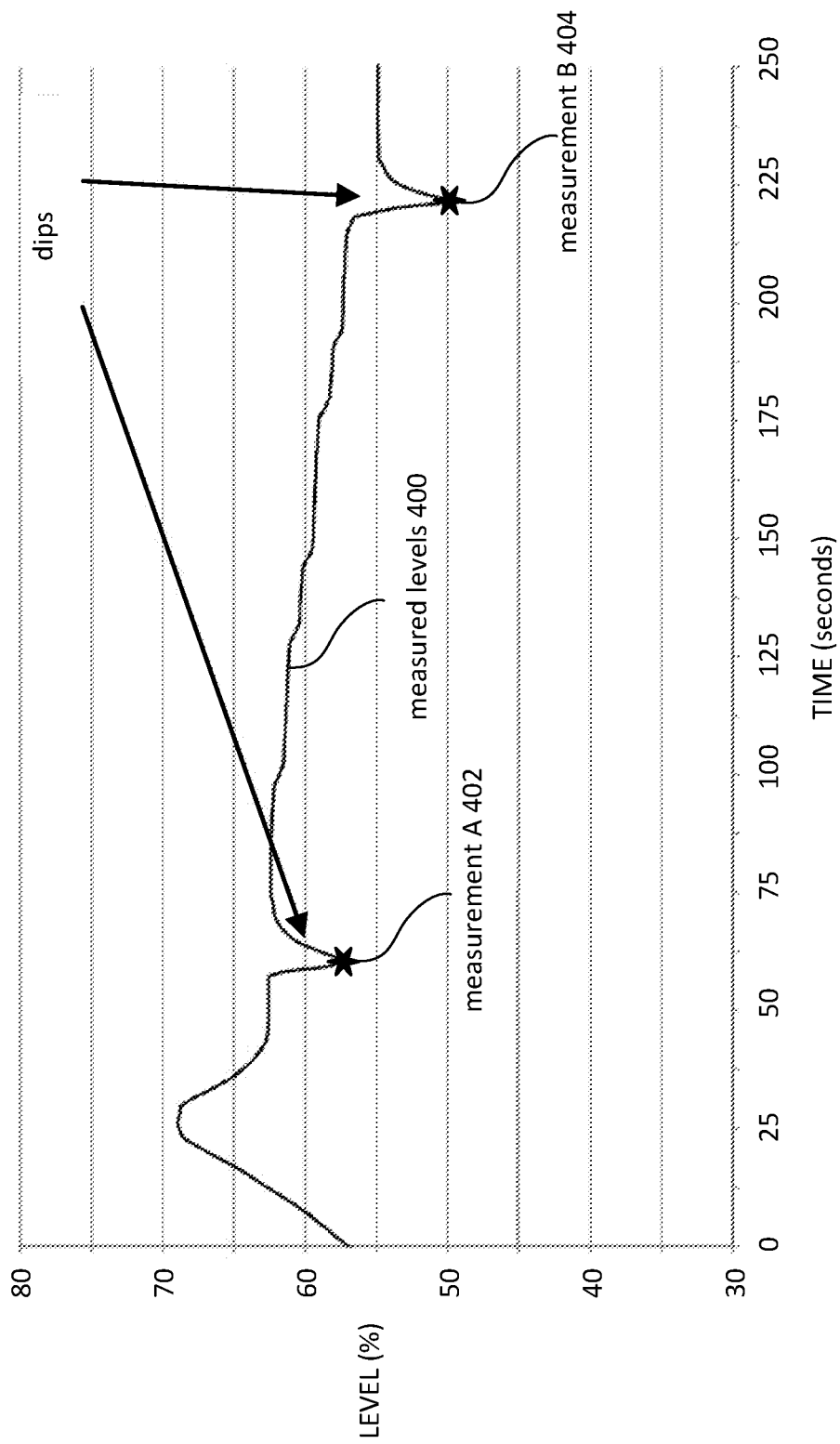
FIG. 4 illustrates an example measurement of substance level within a container.

The substance levels determined at different moments may form a curve of substance level measurements. The curve of substance level measurements may include values of the substance level measurements as a function of progress through a measured duration. For example, FIG. 4 illustrates example measurements of substance level within a container. The measurements of the substance level may form a curve of measured levels 400. The measured levels 400 may include different values of the substance level (expressed as a percentage) measured during a span of time (250 seconds). The measured levels 400 may include two dips in measurements (a measurement A 402, a measurement B 404). The measurements 402, 404 may correspond to values of the substance level measured at moments corresponding to occurrence of one or more measurement disruption events. The measurements 402, 404 may be inaccurate measurements of the substance level due to one or more measurement disruption events. For instance, the measurements 402, 404 may be lower than the actual substance level within the container due to occurrences of radiation events. For example, the dips in the measured levels 400 may be caused by the nuclear level detector 310 receiving the radiation B 309 from the nuclear source 308 around the 63 second mark and around the 222 second mark.

The filtered substance level component 106 may be configured to determine one or more corresponding filtered substance levels for one or more moments based on multiple substance levels at multiple moments preceding the individual moments and/or other information. A corresponding filtered substance level for a moment may refer to a value of substance level that reflects multiple prior measurements of substance levels. The multiple prior measurements of substance levels may span a duration of time and/or may include a certain number of prior measurements. For example, a corresponding filtered substance level for a particular moment may be determined based on the multiple substance levels at multiple moments preceding the particular moment. The multiple substance levels may include the substance levels measured during a particular preceding duration (e.g., last 8 seconds of measurements) or may include a particular number of prior measurements (e.g., last 8 measurements). The filtered substance level component 106 may determine corresponding filtered substance level(s) for other moment(s).

In some implementations, a corresponding filtered substance level for a moment may be determined based on averaging of multiple substance levels at multiple moments preceding the moment, and/or other information. For example, last 8 seconds of substance level measurements or last 8 substance level measurements may be averaged to determine a corresponding filtered substance level for a particular moment. In some implementations, a corresponding filtered substance level for a moment may be determined based on filtering of multiple substance levels at multiple moments preceding the moment based on a time constant, and/or other information. For example, a particular time constant may be applied to last 8 seconds of substance level measurements to determine a corresponding filtered substance level for a particular moment. Other durations of time and other number of prior measurements for determining corresponding filtered substance levels and other determinations of corresponding filtered substance levels are contemplated.

Figure 5:
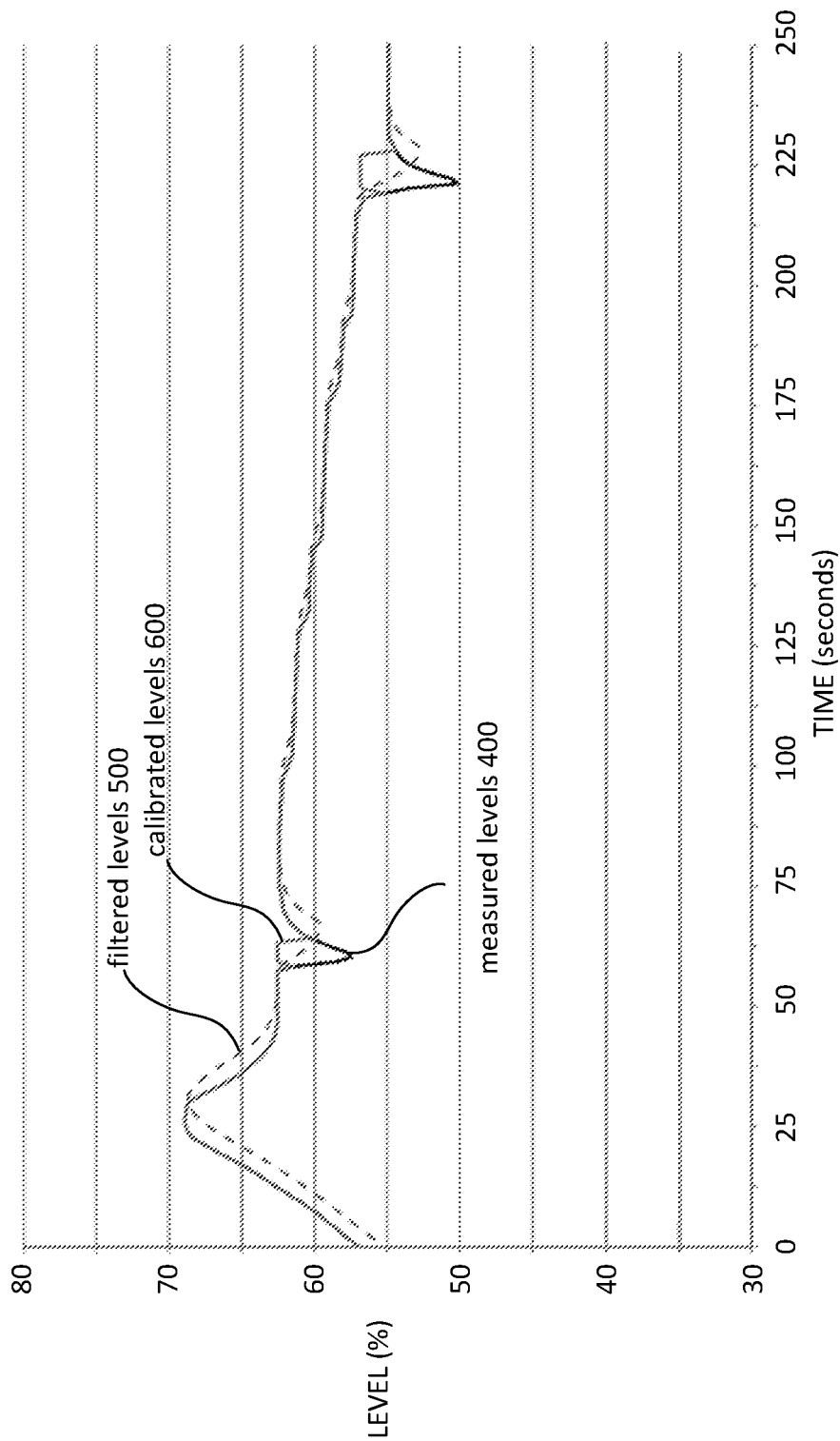
FIG. 5 illustrates example measurement and calibrated measurement of substance level within a container.

The corresponding filtered substance levels determined for different moments may form a curve of filtered substance level measurements. The curve of filtered substance level measurements may include values of the corresponding filtered substance level measurements as a function of progress through a measured duration. For example, FIG. 5 illustrates example measurements of substance level within a container and example measurements of corresponding filtered substance level for different moments during a span of time. The measurements of the substance level may form a curve of the measured levels 400. The measured levels 400 may include different values of the substance level measured during the span of time. The measurements of the corresponding filtered substance level may form a curve of filtered levels 500. The filtered levels 500 may include different values of the corresponding filtered substance level based on prior measured levels 400.

The event criterion component 108 may be configured to obtain one or more measurement disruption event criteria for detecting one or more measurement disruption events for the container. Obtaining a measurement disruption event criterion may include one or more of accessing, acquiring, analyzing, determining, examining, identifying, loading, locating, opening, receiving, retrieving, reviewing, storing, utilizing, and/or otherwise obtaining the measurement disruption event criterion. For example, a measurement disruption event criterion may be stored within one or more files, and the event criterion component 108 may obtain the measurement disruption event criterion by obtaining the file(s). A measurement disruption event criterion may be coded into one or more logics, one or more functions, one or more operations, and/or one or more programs and the event criterion component 108 may obtain the measurement disruption event criterion by obtaining the logic(s), the function(s), the operation(s), and/or the program(s). Other storage and obtaining of measurement disruption event criteria are contemplated.

A measurement disruption event criterion may refer to one or more standards by which an occurrence of a measurement disruption event may be detected. A measurement disruption event criterion may define one or more factors that may be used to detect whether a measurement disruption event has occurred and/or is occurring. For example, a measurement disruption event criterion may include a radiation event criterion and/or other event criteria. The radiation event criterion may define one or factors that may be used to detect whether a radiation event has occurred and/or is occurring. Other measurement disruption event criteria are contemplated.

A measurement disruption event criterion may be satisfied based on one or more characteristics of the substance level and/or the corresponding filtered substance level. For example, a measurement disruption event criterion may be satisfied based on (1) a substance level of the container at a moment being smaller than a corresponding filtered substance level, (2) a difference between the substance level at the moment and the corresponding filtered substance level exceeding a difference threshold, and/or other information. Such a measurement disruption criterion may be used to detect measurement disruption events that cause dips (sharp decreases) in substance level measurements, such as a radiation event for the nuclear level detector 310.

As another example, a measurement disruption event criterion may be satisfied based on (1) a substance level of the container at a moment being larger than a corresponding filtered substance level, (2) a difference between the substance level at the moment and the corresponding filtered substance level exceeding a difference threshold, and/or other information. Such a measurement disruption criterion may be used to detect measurement disruption events that cause spikes (sharp increases) in substance level measurements.

As yet another example, a measurement disruption event criterion may be satisfied based on the difference between the substance level at the moment and the corresponding filtered substance level exceeding a difference threshold, without regard for whether the substance level of the container at a moment is larger or smaller than a corresponding filtered substance level. Such a measurement disruption criterion may be used to detect measurement disruption events that cause dips and/or spikes in substance level measurements.

A difference threshold may refer to a value by which difference between the substance level at the moment and the corresponding filtered substance level must be exceeded for an occurrence of a measurement disruption event to be detected. The difference threshold being exceeded may include the difference being greater than the difference threshold. In some implementations, the difference threshold may be considered to be exceeded based on the difference being equal to the difference threshold.

In some implementation, the difference threshold may be set based on the highest potential rate of change in the substance level. For example, referring to FIG. 3, a worst-case scenario for change in the substance level of the container 302 may include the exit opening (opening through which substance 304 exits the container 302) being completely opened (e.g., the mechanism for closing the exit opening failing and the exit opening falling wide open). The difference threshold may be set above the substance level change that would be experienced during the worst-cast scenario so that such a scenario is not misinterpreted as a measurement disruption event. On the other hand, setting the difference threshold too high may result in non-detection of measurement disruption events.

Thus, the difference threshold may be set based on the substance level change that may be expected from a worst-case scenario and the substance level change that may be expected from a measurement disruption event. For example, for the movement of the substance 304 through the container 302, the difference threshold may be set around or between 2% and 3%. For containers that are quickly filled/ emptied, the difference threshold may be increased (e.g., to 4.5%) to prevent normal movement of substance through the container from being detected as a measurement disruption event.

In some implementations, the difference threshold may include a percentage difference between the substance level and the corresponding filtered substance level. That is, rather than setting the difference threshold to some absolute value (e.g., absolute difference in substance levels), the different threshold may be set as a certain percentage difference between the substance level and the corresponding filtered substance level. The use of the percentage difference over absolute difference as the difference threshold may enable predictable and consistent detection of occurrences of measurement disruption events, regardless of whether the substance level is near the top (e.g., towards 100%) or near the bottom (e.g., near 0%) of the scale. The use of the percentage difference over absolute difference as the difference threshold may provide an advantage of increased gains at lower substance levels.

The event detection component 110 may be configured to detect an occurrence of a measurement disruption event at one or more moments based on one or more measurement disruption event criteria, one or more comparisons of the substance level with the corresponding filtered substance level, and/or other information. For example, event detection component 110 may detect an occurrence of a measurement disruption event at a particular moment based on a measurement disruption event criterion that is satisfied based on (1) a substance level of the container at a moment being smaller than a corresponding filtered substance level, (2) a difference between the substance level at the moment and the corresponding filtered substance level exceeding a difference threshold, a comparison of the substance level at the particular moment with the corresponding filtered substance level for the particular moment matching the measurement disruption event criterion, and/or other information. The occurrence of the measurement disruption event at the particular moment may be detected based on the comparison indicating that the substance level is smaller than the corresponding filtered substance level and that the difference between the substance level and the corresponding filtered substance level exceeds the difference threshold.

For example, referring to FIG. 5, two occurrences of measurement disruption event (corresponding to two dips) may be detected in the curve of measured levels 400 based on the curve of measured levels 400 going below the curve of filtered levels 500 and the percentage difference between the measured levels 400 and the filtered levels 500 exceeding the difference threshold (e.g., 5%). Detection of other measurement disruption events based on other measurement disruption event criteria are contemplated.

The calibration component 112 may be configured to, responsive to detection of the occurrence of the measurement disruption event at one or more moments, calibrate the substance level characterized by the fill-level information. Calibration of the substance level characterized by the fill-level information may include adjustment of the substance level measured by the fill-level sensor 14 to account for the impact of the measurement disruption event(s) on the operation of the fill-level sensor 14. For example, the substance level measured by the fill-level sensor 14 may be increased/decreased to account for a measurement disruption event causing the fill-level sensor 14 to report lower/higher substance level measurement than the actual substance level within the container. Thus, the output of the fill-level sensor 14 may be calibrated to account for inaccuracies introduced into the substance level measurement by the measurement disruption event. For example, referring to FIG. 5, portions of the measured levels 400 corresponding to two dips in measurement may be calibrated using calibrated levels 600. As shown in FIG. 5, the portions of the measured levels 400 corresponding to two dips in measurement may be truncated and replaced with other values.

Calibration of the substance level may include replacement of one or more substance level at one or more moments with a prior substance level. For example, responsive to detection of an occurrence of a measurement disruption event at a particular moment, the calibration component 112 may replace the substance level at the moment with a prior substance level at a prior moment preceding the moment. That is, the value of the substance level measurement for the moment may be replaced with a prior value of the substance level measurement for a prior moment. The prior value of the substance level may be a value that was measured a certain duration prior to the moment (e.g., value measured 2 seconds before the moment at which the occurrence of the measurement disruption event was detected) and/or the last known valid value of substance level measurement (e.g., last valid value of the substance measurement not affected by a measurement disruption event).

In some implementations, the prior substance level may be held for a duration following the corresponding moment (the moment at which the occurrence of the measurement disruption event was detected). That is, the prior value of the substance level may be outputted as the calibrated substance level for a duration of time following the moment at which the measurement disruption event occurred.

The duration for which the prior substance level is held (outputted as the calibrated substance level) may be determined based on a hold time, the current measurements of the substance level, and/or other information. A hold time may refer to a duration of time for which the prior substance level may be held. A hold time may limit the amount of duration for which the prior substance level is held before the output of the substance level measurement returns to the substance level actually measured by the fill-level sensor 14. The hold time may work as a safety mechanism to prevent prior substance level from being held indefinitely.

In some implementations, the hold time may be a static or a predetermined duration of time. For example, for a container that is quickly filled/emptied, the hold time may be set at a particular duration (e.g., 20 seconds) due to the quick rate at which the substance level changes during normal usage of the container and/or the use of the substance level as a proxy for substance flow rate. Different containers and/or different uses of the containers may be associated different static/predetermined hold times.

In some implementations, the hold time may be a variable duration of time that depends on one or more operating conditions and/or characteristics of the container. For example, the hold time for a container may be determined based on the substance level/prior substance level, a minimum substance level for the container, a substance level change rate for the container, and/or other information. The minimum substance level for the container may refer to a minimum level of acceptable substance level in the container. The substance level falling below the minimum substance level of the container may result in one or more undesirable outcomes. For example, the container may be used to control the flow of substance to a tool, and the substance level in the container falling below the minimum substance level may prompt and/or require shutdown of the tool (e.g., for safety reasons). The substance level change rate for the container may refer to one or more expected or potential rate of change in the substance level. For example, the substance level change rate for the container may include the highest potential rate of change in the substance level (e.g., the rate of change in worst case scenario).

For instance, the hold time for a container may be calculated as the difference between (1) the substance level at the moment the measurement disruption event occurred (e.g., actual substance level measurement, the prior substance level replacing the actual substance level measurement) and (2) the minimum substance level for the container, divided by the substance level change rate for the container. For example, based the substance level of a container when the measurement disruption event occurred being 40%, the minimum substance level for the container being 20%, and the substance level change rate in a worst-case scenario for the container being 5% per minute, the hold time for the container may be calculated as 4 minutes ((40−20)/5).

The duration for which the prior substance level is held may be determined based on a comparison of a current substance level with the prior substance level, and/or other information. The current substance level may refer to the latest/real-time substance level measurement outputted by the fill-level sensor 14. The duration may terminate based on the current substance level being within a threshold percentage of the prior substance level. That is, the prior substance level may be held until the current substance level rebounds to within the threshold percentage of the prior substance level. For example, the threshold percentage may be 3% and the last known good/valid value may be held as the calibrated substance level until the current substance level actually measured by the fill-level sensor 14 rebounds to be at and/or within 97% of the last known good/valid value. That is, when the current substance level comes within the threshold percentage of the prior substance value being held as the calibrated substance level, the current substance level may be provided as the measured substance level.

In some implementations, the prior substance level may be held until earlier of (1) the hold time running out, or (2) the current substance level coming within a threshold percentage of the prior substance value. For example, a counter may be stated with the initial replacement of the substance level with the prior substance level, and the current substance level may be monitored. If the current substance level measured by the fill-level sensor 14 comes within the threshold percentage of the prior substance value before the counter reaches the hold time, the holding of the prior substance level may be terminated when the current substance level comes within the threshold percentage of the prior substance value. If the counter reaches the hold time before the current substance level comes within the threshold percentage of the prior substance value, the holding of the prior substance level may be terminated at the end of the hold time.

Figure 6:
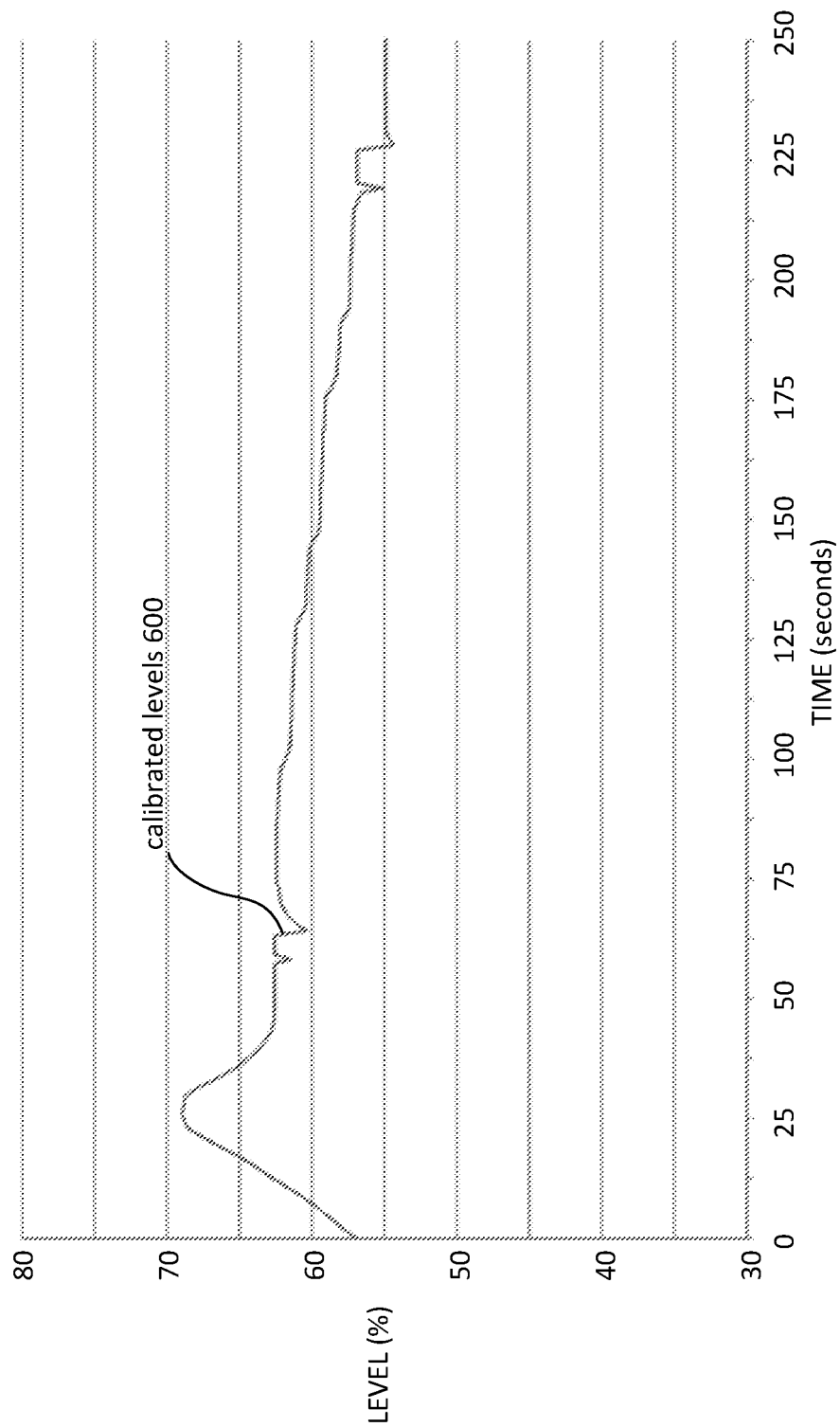
FIG. 6 illustrates an example of calibrated measurement of substance level within a container.

FIG. 6 illustrates an example of calibrated measurement of substance level within a container. The curve of calibrated levels 600 may include actual values of substance level measured by the fill-sensor 14 for durations in which an occurrence of a measurement disruption event is not detected and may include values of prior substance levels for duration in which an occurrence of a measurement disruption event is detected. Such calibration of the substance level may result in the output of the fill-level sensor 14 being modified such that two dips (shown in FIG. 4) in the curve of measured levels 400 are removed and replaced with values of prior substance levels.

The calibration of the substance level disclosed herein may prevent erroneous reporting of substance level due to measurement disruption events, may prevent undesirable usage of the container, and/or may prevent undesirable operation of related equipment. For example, the calibration of the substance level may prevent substance level reported by the fill-level sensor 14 from falling below a minimum substance level for the container and prevent shutdown of a tool that receives substance(s) from the container. The calibration of the substance level disclosed herein may enable correction of measured substance level without affecting the normal response time of the fill-level sensor 14, may enable adjustment of measured substance level to account for measurement disruption events including high-level radiation of energy, and may enable detection of measurement disruption events that do not completely zero the readings of the fill-level sensor 14. Additionally, the amount of shielding around the fill-level sensor 14 may be reduced or eliminated as the calibration accounts for impacts of measurement disruption events on the substance level measurement readings.

Other benefits of the substance level calibration disclosed herein may include reduction of down time for the container and related tools, reduction of overtime scheduling of radiographic photography, reduction of equipment damage from thermal cycling, and improvement in product specifications with improved control loop measure.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the fill-level sensor 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. For example, some or all of the computer program components may be located within the fill-level sensor 14. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
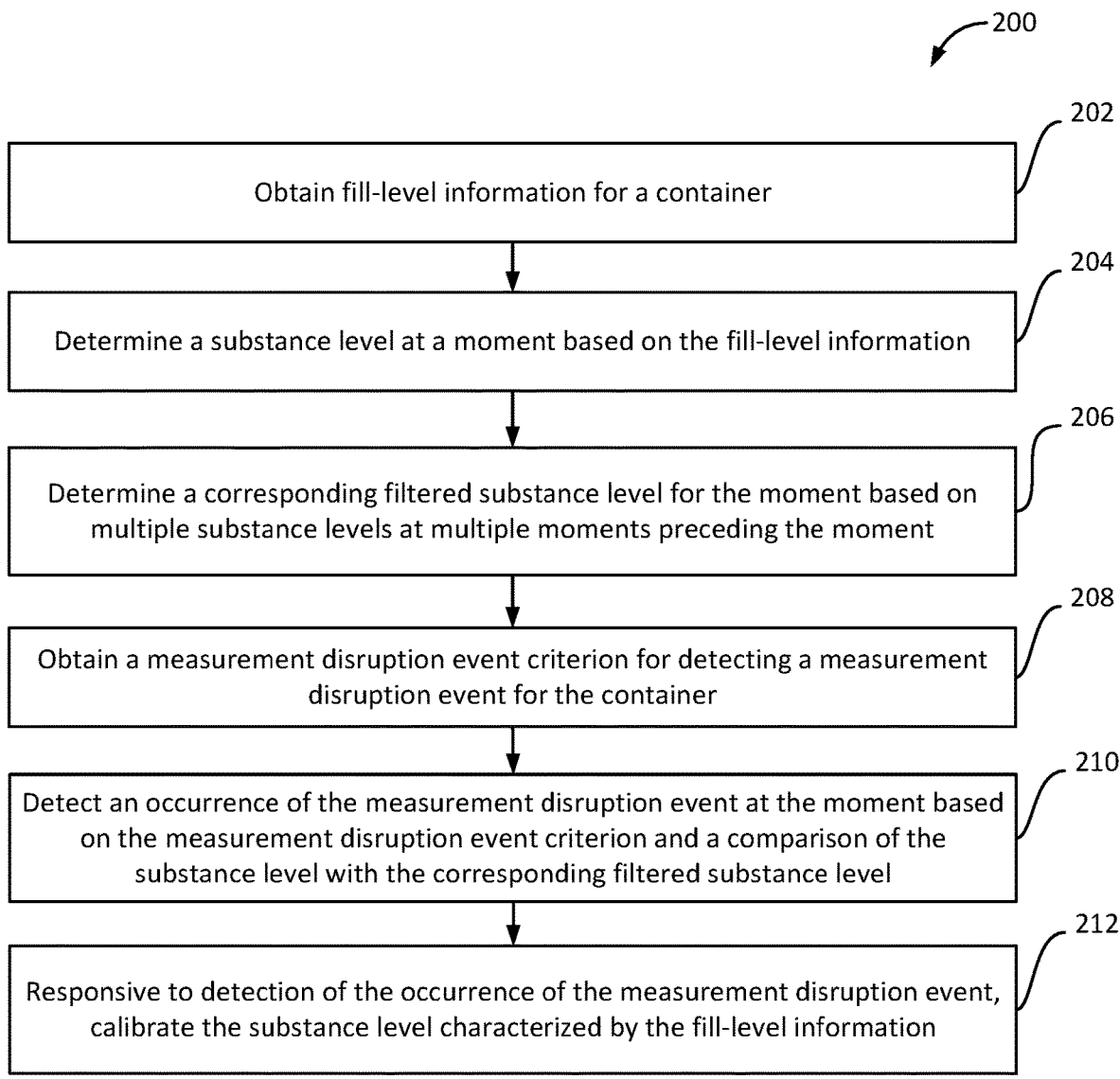
FIG. 2 illustrates an example method for calibrating measured fill-level of a container.

FIG. 2 illustrates method 200 for calibrating measured fill-level of a container. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, At operation 202, fill-level information for a container may be obtained. The fill-level information may characterize a substance level of one or more substances within the container at different moments. In some implementation, operation 202 may be performed by a processor component the same as or similar to the fill-level information component 102 (Shown in FIG. 1 and described herein).

At operation 204, a substance level at a moment may be determined based on the fill-level information. In some implementation, operation 204 may be performed by a processor component the same as or similar to the substance level component 104 (Shown in FIG. 1 and described herein).

At operation 206, a corresponding filtered substance level for the moment may be determined based on multiple substance levels at multiple moments preceding the moment. In some implementation, operation 206 may be performed by a processor component the same as or similar to the filtered substance level component 106 (Shown in FIG. 1 and described herein).

At operation 208, a measurement disruption event criterion for detecting a measurement disruption event for the container may be obtained. The measurement disruption event criterion may be satisfied based on a substance level at a moment being smaller than a corresponding filtered substance level and a difference between the substance level at the moment and the corresponding filtered substance level exceeding a difference threshold. In some implementation, operation 208 may be performed by a processor component the same as or similar to the event criterion component 108 (Shown in FIG. 1 and described herein).

At operation 210, an occurrence of the measurement disruption event at the moment may be detected based on the measurement disruption event criterion and a comparison of the substance level with the corresponding filtered substance level. The substance level may be smaller than the corresponding filtered substance level and the difference between the substance level and the corresponding filtered substance level may exceed the difference threshold. In some implementation, operation 210 may be performed by a processor component the same as or similar to the event detection component 110 (Shown in FIG. 1 and described herein).

At operation 212, responsive to detection of the occurrence of the measurement disruption event, the substance level characterized by the fill-level information may be calibrated. In some implementation, operation 212 may be performed by a processor component the same as or similar to the calibration component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for calibrating measured fill-level of a container, the system comprising:
one or more physical processors configured by machine-readable instructions to:
obtain fill-level information for the container, the fill-level information characterizing a substance level of one or more substances within the container at different moments;
determine a first substance level at a first moment based on the fill-level information;
determine a first corresponding filtered substance level for the first moment based on multiple substance levels at multiple moments preceding the first moment;
obtain a measurement disruption event criterion for detecting a measurement disruption event for the container, the measurement disruption event criterion being satisfied based on a substance level at a moment being smaller than a corresponding filtered substance level and a difference between the substance level at the moment and the corresponding filtered substance level exceeding a difference threshold;
detect an occurrence of the measurement disruption event at the first moment based on the measurement disruption event criterion and a comparison of the first substance level with the first corresponding filtered substance level, wherein the first substance level is smaller than the first corresponding filtered substance level and the difference between the first substance level and the first corresponding filtered substance level exceeds the difference threshold; and
responsive to detection of the occurrence of the measurement disruption event at the first moment, calibrate the substance level characterized by the fill-level information.

2. The system of claim 1, wherein the calibration of the substance level includes replacement of the first substance level at the first moment with a prior substance level at a prior moment preceding the first moment.

3. The system of claim 2, wherein the prior substance level is held for a duration following the first moment, the duration determined based on the prior substance level, a minimum substance level for the container, and a substance level change rate for the container.

4. The system of claim 2, wherein the prior substance level is held for a duration following the first moment, the duration determined based on a comparison of a current substance level with the prior substance level.

5. The system of claim 4, wherein the duration terminates based on the current substance level being within a threshold percentage of the prior substance level.

6. The system of claim 1, wherein the difference threshold includes a percentage difference between the first substance level and the first corresponding filtered substance level.

7. The system of claim 1, wherein the first corresponding filtered substance level for the first moment is determined based on averaging of the multiple substance levels at the multiple moments preceding the first moment.

8. The system of claim 1, wherein the first corresponding filtered substance level for the first moment is determined based on filtering of the multiple substance levels at the multiple moments preceding the first moment based on a time constant.

9. The system of claim 1, further comprising a fill-level sensor configured to generate an output signal conveying the fill-level information for the container, the fill-level sensor including a nuclear source and a nuclear level detector.

10. The system of claim 9, wherein the measurement disruption event includes the nuclear level detector receiving an X-ray from another nuclear source, the X-ray emitted by the other nuclear source for radiographic photography and impacting accuracy of the nuclear level detector.

11. A method for calibrating measured fill-level of a container, the method comprising:
obtaining fill-level information for the container, the fill-level information characterizing a substance level of one or more substances within the container at different moments;
determining a first substance level at a first moment based on the fill-level information;
determining a first corresponding filtered substance level for the first moment based on multiple substance levels at multiple moments preceding the first moment;
obtaining a measurement disruption event criterion for detecting a measurement disruption event for the container, the measurement disruption event criterion being satisfied based on a substance level at a moment being smaller than a corresponding filtered substance level and a difference between the substance level at the moment and the corresponding filtered substance level exceeding a difference threshold;
detecting an occurrence of the measurement disruption event at the first moment based on the measurement disruption event criterion and a comparison of the first substance level with the first corresponding filtered substance level, wherein the first substance level is smaller than the first corresponding filtered substance level and the difference between the first substance level and the first corresponding filtered substance level exceeds the difference threshold; and
responsive to detection of the occurrence of the measurement disruption event at the first moment, calibrating the substance level characterized by the fill-level information.

12. The method of claim 11, wherein calibrating the substance level includes replacing the first substance level at the first moment with a prior substance level at a prior moment preceding the first moment.

13. The method of claim 12, wherein the prior substance level is held for a duration following the first moment, the duration determined based on the prior substance level, a minimum substance level for the container, and a substance level change rate for the container.

14. The method of claim 12, wherein the prior substance level is held for a duration following the first moment, the duration determined based on a comparison of a current substance level with the prior substance level.

15. The method of claim 14, wherein the duration terminates based on the current substance level being within a threshold percentage of the prior substance level.

16. The method of claim 11, wherein the difference threshold includes a percentage difference between the first substance level and the first corresponding filtered substance level.

17. The method of claim 11, wherein the first corresponding filtered substance level for the first moment is determined based on averaging of the multiple substance levels at the multiple moments preceding the first moment.

18. The method of claim 11, wherein the first corresponding filtered substance level for the first moment is determined based on filtering of the multiple substance levels at the multiple moments preceding the first moment based on a time constant.

19. The method of claim 11, wherein the fill-level information for the container is conveyed by an output signal, the output signal generated by a fill-level sensor, the fill-level sensor including a nuclear source and a nuclear level detector.

20. The method of claim 19, wherein the measurement disruption event includes the nuclear level detector receiving an X-ray from another nuclear source, the X-ray emitted by the other nuclear source for radiographic photography and impacting accuracy of the nuclear level detector.

* * * * *